US010514315B2

(12) United States Patent
Hashimoto et al.

(10) Patent No.: US 10,514,315 B2
(45) Date of Patent: Dec. 24, 2019

(54) SENSOR UNIT AND AIRTIGHTNESS INSPECTION DEVICE

(71) Applicant: J.E.T. CO., LTD., Asakuchi-gun, Okayama (JP)

(72) Inventors: Shigeki Hashimoto, Okayama (JP); Manabu Ohtagaki, Okayama (JP)

(73) Assignee: J.E.T. CO., LTD., Asakuchi-gun, Okayama (JP)

( * ) Notice: Subject to any disclaimer, the term of this patent is extended or adjusted under 35 U.S.C. 154(b) by 164 days.

(21) Appl. No.: 15/747,690

(22) PCT Filed: Jun. 20, 2016

(86) PCT No.: PCT/JP2016/068300
§ 371 (c)(1),
(2) Date: Jan. 25, 2018

(87) PCT Pub. No.: WO2017/022349
PCT Pub. Date: Feb. 9, 2017

(65) Prior Publication Data
US 2018/0217020 A1    Aug. 2, 2018

(30) Foreign Application Priority Data
Aug. 3, 2015  (JP) ................................ 2015-153369

(51) Int. Cl.
*G01M 3/02*  (2006.01)
*G01M 3/20*  (2006.01)
(Continued)

(52) U.S. Cl.
CPC ....... *G01M 3/225* (2013.01); *H01M 10/0525* (2013.01); *H01M 10/4285* (2013.01); *H01M 2220/30* (2013.01)

(58) Field of Classification Search
CPC ............ G01M 3/00; G01M 3/02; G01M 3/20; G01M 3/225; H01M 10/0525;
(Continued)

(56) References Cited

U.S. PATENT DOCUMENTS 9,360,465 B2 *  6/2016  Wetzig ................. G01M 3/002
2018/0202889 A1 *  7/2018  Perrissoud ............ G01M 3/226

FOREIGN PATENT DOCUMENTS

JP    S50-007095 U    1/1975
JP    S61-011630 Y2   4/1986
(Continued)

Primary Examiner — Nguyen Q. Ha
(74) Attorney, Agent, or Firm — Muncy, Geissler, Olds & Lowe, P.C.

(57) ABSTRACT

A lithium ion battery (11) that is a test object is housed in a vacuum chamber (14). An initial exhaust pipe (47) and an inspection exhaust pipe (51) are connected to the upper portion of the vacuum chamber (14). The inside of the vacuum chamber (14) is subjected to an initial exhaust through the initial exhaust pipe (47) to lower the pressure inside the vacuum chamber (14) to an inspection pressure (Pe). Thereafter, an inspection exhaust is performed through the inspection exhaust pipe (51). A sensor unit (16) is interposed in the inspection exhaust pipe (51). Exhaust gas passing through the inspection exhaust pipe (51) flows into the sensor unit (16) from an inlet port, and is caused to flow perpendicularly toward the sensor face of a gas sensor by a nozzle provided inside the sensor unit (16). The exhaust gas passes through the inside of the gas sensor, and is discharged to outside of the sensor unit (16) from an exhaust port.

9 Claims, 7 Drawing Sheets

(51) Int. Cl.
*G01M 3/22* (2006.01)
*H01M 10/0525* (2010.01)
*H01M 10/42* (2006.01)
*H01M 10/48* (2006.01)

(58) Field of Classification Search
CPC .. H01M 10/42; H01M 10/4285; H01M 10/48; H01M 2220/30
See application file for complete search history.

(56) References Cited

FOREIGN PATENT DOCUMENTS

| | | | |
|---|---|---|---|
| JP | 62056831 A * | 3/1987 | ............ G01M 3/20 |
| JP | S63-067643 B2 | 12/1988 | |
| JP | H3-002254 U | 1/1991 | |
| JP | 5050139 B1 | 10/2012 | |

* cited by examiner

SENSOR UNIT AND AIRTIGHTNESS INSPECTION DEVICE

TECHNICAL FIELD

The present invention relates to a sensor unit and an airtightness inspection device.

BACKGROUND ART

Lithium ion batteries are widely utilized as power sources for portable electronic devices. A lithium ion battery has a structure in which a positive electrode, a negative electrode, a separator and an electrolyte that includes an organic solvent are enclosed inside a hermetically sealed container. If the sealing of the container of the lithium ion battery is defective, electrolyte will leak out from the location of the defect. Therefore, lithium ion batteries are subjected to an inspection using an airtightness inspection device.

An airtightness inspection device disclosed in Patent Literature 1 includes: a two-layered storing container that is divided into a first storage section and a second storage section; a suction device that sucks out gas from inside the second storage section and decompresses the gas; a gas shutoff valve that is provided in a first communication port between the first storage section and the second storage section; and a sensor unit (gas detection means) that is provided in a second communication port. In the aforementioned airtightness inspection device, when performing an airtightness inspection, a lithium ion battery is disposed in the first storage section, the second storage section is decompressed in a state in which the gas shutoff valve is open, and the gas shutoff valve is then closed. Thereby, a gas that is inside the first storage section flows into the second storage section through the sensor unit, and at that time the sensor unit detects whether or not a solvent gas from an organic solvent that originates from the lithium ion battery whose airtightness is defective is contained in the gas. The sensor unit is constituted by a semiconductor-type gas sensor, and a cylindrical holder that holds the gas sensor in a hollow interior of the holder, in which exhaust holes are provided in the circumferential face of the holder. Thereby, gas that flows into the holder from one end of the holder that is arranged on the first storage section side turns at the front face of the gas sensor so as to move towards the exhaust holes, and flows into the second storage section through the exhaust holes.

CITATION LIST

Patent Literature

Patent Literature 1: Japanese Patent No. 5050139

SUMMARY OF INVENTION

Technical Problem

The cause of a leakage of electrolyte in a lithium ion battery is pinholes that are caused by welding errors that occur when hermetically sealing the hermetically sealed container or pinholes that arise when subjecting a laminate material to thermocompression bonding. Pinholes are liable to arise if welding work is performed while foreign material or electrolyte is adhered to the portion that is being welding. In the case of a laminate material, in some cases pinholes are originally present in the laminated packaging material. The pinholes are of various sizes, and in the case of small pinholes the diameter may sometimes be 3 μm or less, and there is a need for a sensor unit having detection accuracy that is capable of detecting such small pinholes.

The present invention has been made to solve the aforementioned problem, and an object of the present invention is to provide a sensor unit that can enhance detection accuracy with respect to airtightness, and an airtightness inspection device that uses the sensor unit.

Solution to Problem

A sensor unit of the present invention includes a sensor section that detects a gaseous detection target substance, and a holder that internally holds the sensor section, wherein: the sensor section includes an element that reacts with the detection target substance, and a case inside which the element is arranged, and which has a first opening provided in one face and a second opening provided in another face on an opposite side to the one face; and the holder includes an inlet port that introduces a gas into inside of the holder, a supply port that is arranged at a position that is close to the one face and that allows a gas that is introduced into inside of the holder to pass through to the one face side, a hollow section into which a gas that passes through inside of the case flows from the second opening, an annular or C-shaped first flow channel that is formed in a circumferential direction of the hollow section, a plurality of second flow channels that are provided at predetermined intervals in the circumferential direction of the hollow section and that connect the hollow section and the first flow channel, and an exhaust port that is connected to the first flow channel at a different position from the second flow channels and that discharges a gas that is inside the holder.

An airtightness inspection device of the present invention includes the aforementioned sensor unit, a vacuum chamber that houses an inspection target object, and an inspection exhaust section that has an inspection exhaust pipe which is connected to the vacuum chamber and that performs an inspection exhaust from the vacuum chamber through the inspection exhaust pipe; wherein the sensor unit is interposed in the inspection exhaust pipe, and introduces an exhaust gas that is exhausted from the vacuum chamber into inside of the holder through the inlet port.

Advantageous Effect of Invention

According to the present invention, a supply port that allows a gas which was introduced into the inside of a holder to pass through the supply port is placed close to a sensor face of a sensor section, and effectively introduces the gas into the inside of the sensor section, and therefore a detection target substance contained in the gas can be detected with high detection accuracy.

DESCRIPTION OF EMBODIMENT

Figure 1:
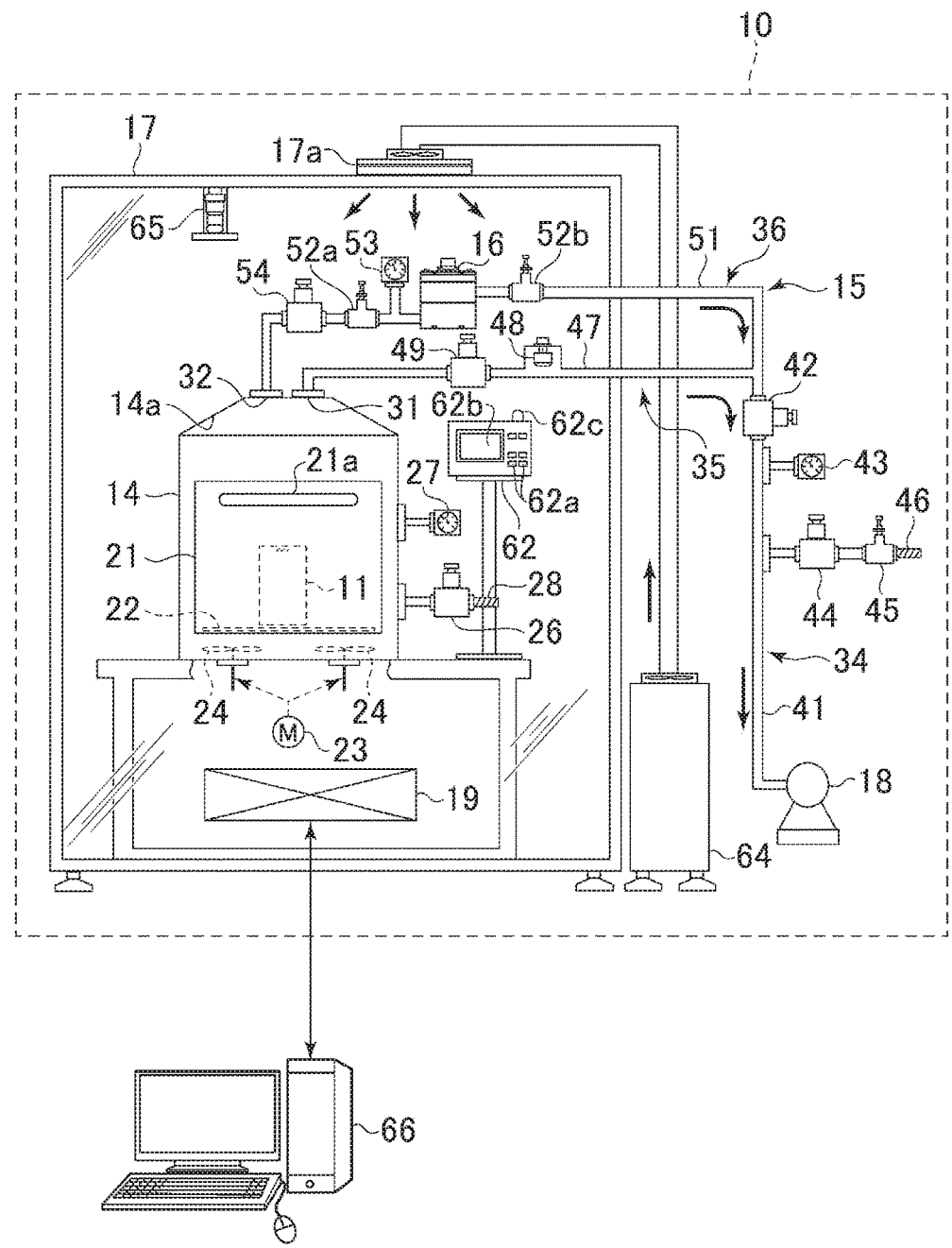
FIG. 1 is an explanatory drawing illustrating the configuration of an airtightness inspection device that implements the present invention.

FIG. 1 illustrates an airtightness inspection device (hereunder, referred to simply as "inspection device") 10 according to an embodiment of the present invention. In this example, the inspection device 10 performs an airtightness inspection on a lithium ion battery 11 that is a secondary battery as an inspection target object. In the lithium ion battery 11, for example, an organic solvent such as dimethyl carbonate (DEC), ethyl methyl carbonate (EMC) or ethylene carbonate (EC) as an electrolyte is enclosed inside a container. However, if the hermetic sealing of the container is defective, the electrolyte will leak out from the location of the defect. When performing an inspection in the inspection device 10, by determining the presence or absence of a solvent gas that is produced by vaporization of an electrolyte that leaks out from a location at which the hermetic sealing is defective, the inspection device 10 determines whether or not the airtightness of the lithium ion battery 11 is maintained.

The inspection device 10 is constituted by a vacuum chamber 14, a pipe section 15, the sensor unit 16, a clean booth 17, a vacuum pump 18, a control section 19 and the like. In an inspection performed by the inspection device 10, after the lithium ion battery 11 housed inside the vacuum chamber 14, an initial exhaust that lowers a chamber internal pressure Pc inside the vacuum chamber 14 to a predetermined inspection pressure Pe, and an inspection exhaust after the initial exhaust are performed.

The vacuum chamber 14 is arranged inside the clean booth 17. When performing an inspection, the vacuum chamber 14 is placed in a vacuum state by sucking out gas that is inside the vacuum chamber 14 as exhaust gas by means of the vacuum pump 18 through the pipe section 15. The inspection pressure Pe of the vacuum chamber 14 is, for example, approximately 5 kPa to 20 kPa. Therefore, besides constructing the vacuum chamber 14 using a metal such as stainless steel, the vacuum chamber 14 can also be constructed using a combination of an acrylic material and an O-ring by adjusting the size of the vacuum chamber 14 or making the vacuum chamber 14 a structure that has reinforced strength, and this is advantageous with respect to achieving a reduction in cost and a reduction in weight. A door 21 is provided in the vacuum chamber 14. The door 21 is opened to insert the lithium ion battery 11 into the vacuum chamber 14 and to take the lithium ion battery 11 out therefrom. Reference character 21*a* denotes a handle that is used when opening or closing the door 21. The vacuum chamber 14 is the only vacuum vessel used for inspection, and multiple vacuum vessels are not required, and thus the structure is advantageous for reducing the number of components and reducing the manufacturing cost.

For example, a plurality of plate heaters 22 are arranged at appropriate intervals on the bottom face of the vacuum chamber 14. The plate heaters 22 heat the lithium ion battery 11 to an appropriate temperature to activate the generation of a solvent gas. A fan 24 that is driven by a motor 23 is provided on the underside of the plate heater 22, in a space between the underside of the plate heater 22 and the bottom of the vacuum chamber 14. The fan 24 rotates during an inspection. Thereby, the solvent gas is prevented from staying at the lower part of the vacuum chamber 14.

An atmospheric release valve 26 and a pressure gauge 27 are provided at the side face of the vacuum chamber 14. Opening and closing of the atmospheric release valve 26 are controlled by the control section 19. The atmospheric release valve 26 is closed during an inspection, and is opened when returning the inside of the vacuum chamber 14 to atmospheric pressure. A filter 28 is connected to the atmospheric release valve 26. When the atmospheric release valve 26 is opened, the atmosphere inside the clean booth 17 flows into the vacuum chamber 14 through the filter 28. Thereby, contamination of the inside of the vacuum chamber 14 and the sensor unit 16 and the like is prevented. The pressure gauge 27 measures and displays the chamber internal pressure Pc, and sends the measurement value to the control section 19.

An upper inner circumferential face 14*a* of the vacuum chamber 14 inclines downward to the inside of the vacuum chamber 14. Further, an initial exhaust port 31 and an inspection exhaust port 32 are provided in a ceiling surface that is at the highest position in the vacuum chamber 14. By causing the upper inner circumferential face 14*a* to incline, solvent gas is prevented from staying at the upper part of the vacuum chamber 14, and the solvent gas is caused to smoothly flow toward the inspection exhaust port 32. The inclination angle of the upper inner circumferential face 14*a* is preferably an angle of 15° or more.

The pipe section 15 includes a common piping system 34 that is used commonly for an initial exhaust and an inspection exhaust, an initial exhaust system 35 that constitutes an initial exhaust section together with the common piping system 34 and that performs an initial exhaust, and an inspection exhaust system 36 that constitutes an inspection exhaust section together with the common piping system 34 and that performs an inspection exhaust. The common piping system 34 has a common pipe 41, a valve for pump 42 which has a check valve, a pressure gauge 43, a pressure regulating valve 44, a flow control valve 45 and a filter 46. One end of the common pipe 41 is connected to the vacuum pump 18, and the initial exhaust system 35 and the inspection exhaust system 36 are connected to the other end side. Evacuation of gas in the vacuum chamber 14 is performed by the initial exhaust system 35 or the inspection exhaust system 36 through the common pipe 41 by means of the vacuum pump 18.

The valve for pump 42 is controlled to open and close by the control section 19. The valve for pump 42 is a component for preventing air from flowing into the vacuum chamber 14 through the common pipe 41 when the vacuum pump 18 is stopped, and is opened and closed in synchrony with operation of the vacuum pump 18. That is, during an inspection, the valve for pump 42 is opened when the vacuum pump 18 is operating and is closed when operation of the vacuum pump 18 is stopped.

The pressure gauge 43 measures and displays a pipe internal pressure Pt of the common pipe 41, and sends the measurement value to the control section 19. The pressure regulating valve 44 is connected at a position that is further on a downstream side (vacuum pump 18 side) relative to the valve for pump 42 of the common pipe 41. The flow control valve 45 and the filter 46 are connected in that order on the opposite side to the common pipe 41 of the pressure regulating valve 44. During an inspection exhaust, opening and closing of the pressure regulating valve 44 is controlled by the control section 19 so that a difference between the pipe internal pressure Pt measured by the pressure gauge 43 and the chamber internal pressure Pc measured by the pressure gauge 27 is constant. Thereby, the occurrence of a situation in which, due to continuous operation of the vacuum pump 18, the pipe internal pressure Pt becomes much lower than the chamber internal pressure Pc and a difference between the pipe internal pressure Pt and the chamber internal pressure Pc becomes large is prevented, and thus the flow rate of exhaust gas that flows to the sensor unit 16 during the inspection exhaust does not fluctuate significantly.

The initial exhaust system 35 has an initial exhaust pipe 47 which has one end connected to the initial exhaust port 31 and the other end connected to the common pipe 41, and a gas sensor for initial exhaust 48 and an initial exhaust valve 49 that are provided in the initial exhaust pipe 47. The gas sensor for initial exhaust 48 is provided further on a downstream side (common pipe 41 side) of the initial exhaust pipe 47 than the initial exhaust valve 49. The initial exhaust valve 49 is controlled to open and close by the control section 19, and is opened at the time of an initial exhaust, and is closed during an inspection exhaust. Thereby, exhaust gas from inside the vacuum chamber 14 flows to the initial exhaust pipe 47 only during an initial exhaust, to thereby depressurize the vacuum chamber 14. For example, a semiconductor-type gas sensor is used as the gas sensor for initial exhaust 48, and an output voltage Va that is in accordance with the gas concentration is output to the control section 19. The output voltage Va from the gas sensor for initial exhaust 48 is used for determining the airtightness of the lithium ion battery 11. Thereby, for example, a case where there is a significant loss in the airtightness of the lithium ion battery 11 is detected at an early stage.

The inspection exhaust system 36 has an inspection exhaust pipe 51 which has one end connected to the inspection exhaust port 32 and the other end connected to the common pipe 41, and also has a pair of flow control valves 52a and 52b, a flowmeter 53 and an inspection exhaust valve 54 which are provided in the inspection exhaust pipe 51. In the inspection exhaust pipe 51, the inspection exhaust valve 54, the flow control valve 52a, the flowmeter 53 and the flow control valve 52b are provided in that order from an upstream side (inspection exhaust port 32 side) of the inspection exhaust pipe 51. Further, the sensor unit 16 is interposed in the inspection exhaust pipe 51, specifically, at a position of the inspection exhaust pipe 51 that is between the flowmeter 53 and the flow control valve 52b on the downstream side of the inspection exhaust valve 54.

Opening and closing of the inspection exhaust valve 54 is controlled by the control section 19, and the inspection exhaust valve 54 is opened only during an inspection exhaust. Thereby, exhaust gas from the vacuum chamber 14 is allowed to flow to the sensor unit 16 through the inspection exhaust pipe 51 only during an inspection exhaust. The flow rate of exhaust gas that flows to the sensor unit 16 is regulated by the flow control valves 52a and 52b that are provided before and after the sensor unit 16. In a case where the capacity of the vacuum chamber 14 is changed according to the size of the lithium ion battery 11, it is necessary to adjust the flow rate of exhaust gas that is allowed to flow to the sensor unit 16, and since the flow control valves 52a and 52b are provided on the upstream side and downstream side of the sensor unit 16 in the inspection device 10, it is possible to adjust the flow rate of the exhaust gas by means of the flow control valves 52a and 52b. Note that, it is also possible to adjust the flow rate by providing only one of the flow control valves 52a and 52b, and the flow rate can also be subjected to fine adjustment by adjusting the suction force of the vacuum pump 18.

The flowmeter 53 measures and displays the flow rate in the inspection exhaust pipe 51, that is, the flow rate of exhaust gas flowing through the sensor unit 16, and also sends the measurement value to the control section 19. Thereby, it is possible to numerically control adjustment of the flow rate with respect to the sensor unit 16, and the reproducibility of the flow rate adjustment can be improved and the reliability of the inspection conditions can also be enhanced.

As described above, the sensor unit 16, the initial exhaust valve 49, the gas sensor for initial exhaust 48, the flow control valves 52a and 52b, the flowmeter 53, the inspection exhaust valve 54 and also the respective devices of the common piping system 34 are each arranged outside of the vacuum chamber 14. Therefore, it is easy to perform adjustment or maintenance of each of these devices, and it is not necessary to make these devices to specifications such that the devices are usable inside a vacuum, and this is advantageous with regard to lowering the cost. Because it is not necessary to provide space within the vacuum chamber 14 to house each of these devices as well as piping for connecting the devices, the size of the vacuum chamber 14 can be reduced by a corresponding amount, and furthermore because of the smaller size of the vacuum chamber 14, the chamber internal pressure Pc can be lowered to the inspection pressure Pe in a short period of time. In particular, by arranging the sensor unit 16 outside of the vacuum chamber 14 by interposing the sensor unit 16 in the inspection exhaust pipe 51, it is possible to dispose the devices of the inspection exhaust system 36 such as the flow control valves 52a and 52b and the flowmeter 53 outside of the vacuum chamber 14 without adopting a complicated piping arrangement.

The sensor unit 16 detects a solvent gas as a gaseous detection target substance. As described in detail later, the sensor unit 16 has a semiconductor-type gas sensor 61 (see FIG. 3) as a sensor section and is provided with a structure that is suited for detection of a trace quantity of a solvent gas, and is configured so as to be capable of detecting defective airtightness caused by small pinholes or the like with high accuracy. The sensor unit 16 outputs an output voltage Vb that is in accordance with the concentration of solvent gas contained in exhaust gas to the control section 19. The output voltage Vb from the sensor unit 16 is used for determining the airtightness of the lithium ion battery 11. The voltage value of the output voltage Vb increases as the quantity of solvent gas contained in the exhaust gas increases.

The control section 19 performs overall control of the inspection device 10. Each of the aforementioned flow control valves 45, 52a and 52b can also be controlled by the control section 19. Further, the control section 19 determines that solvent gas is contained in the exhaust gas, that is, that the airtightness of the lithium ion battery 11 is defective, upon a change (in this example, the amount of increase in the voltage) in the output voltages Va and Vb reaching a predetermined amount. In this example, the period from the start of the initial exhaust to the end of the inspection exhaust is divided into five periods, namely, a T0 period to a T4 period, and allowable voltage increase ranges ($\Delta V0$ to $\Delta V4$) are set for the respective periods. The control section 19 determines that the airtightness of the lithium ion battery 11 is defective when the amount of increase in the output voltages Va and Vb from a reference voltage exceeds the allowable voltage increase range. Note that the number of periods can be arbitrarily set.

In this example the period of the exhaust is taken as the T0 period, and the period of the inspection exhaust is divided into the four periods from T1 to T4. The lengths of the respective periods from the T1 period to the T4 period may be the same as each other or may be different from each other. The initial exhaust may also be divided into a plurality of periods. The control section 19 determines whether or not the airtightness of the lithium ion battery 11 is defective by referring to the output voltage Va in the T0 period, and by referring to the output voltage Vb in the T1 period to T4 period. The output voltage Va at the start of the T0 period (initial exhaust) is adopted as the reference voltage for the T0 period, and the output voltage Vb at the start of the T1 period (inspection exhaust) is adopted as the reference voltage for the T1 period. The reference voltage for the respective periods from the T2 period to the T4 period is the smallest output voltage Vb obtained from the T1 period until the time that the relevant period starts. For example, in the T3 period, the smallest output voltage Vb obtained from the T1 period until the start of the T3 period, that is, the smallest output voltage Vb among the output voltages Vb obtained in the T1 period and the T2 period is adopted as the reference voltage for the T3 period.

In each of the periods, if the control section 19 determines that the airtightness of the lithium ion battery 11 is defective, the control section 19 displays information to the effect that the airtightness is defective on a display panel 62b and ends the inspection at that time point. Thereby, it is possible to replace the gas inside the vacuum chamber 14 at a stage where the concentration of the solvent gas inside the vacuum chamber 14 is low, and it is thereby possible to transition to the next inspection in a short period of time. Note that, a configuration may also be adopted that enables selection of a setting such that, in a case where the control section 19 determines that the airtightness is defective, the inspection is continued and not ended.

An operation panel 62 is connected to the control section 19. The operation panel 62 includes various operation keys 62a and the display panel 62b. The operation keys 62a can be operated to perform various settings, for example, setting the setting values for the respective flow control valves 45, 52a and 52b, setting the size of a difference between the pipe internal pressure Pt and the chamber internal pressure Pc that is controlled with the pressure regulating valve 44, and setting the allowable voltage increase range. The information displayed on the display panel 62b includes various setting values that have been set, the chamber internal pressure Pc, the pipe internal pressure Pt, and the output voltages Va and Vb of the gas sensor for initial exhaust 48 and the sensor unit 16 and the like. Inspection results are also displayed on the display panel 62b. The display panel 62b also serves as a warning section that issues various kinds of warnings. For example, in a case where the airtightness of the lithium ion battery 11 is defective, a case where the airtightness of the vacuum chamber 14 is defective, or a case where solvent gas in the atmosphere inside the clean booth 17 exceeds a predetermined concentration, the display panel 62b displays information to that effect as a warning. Note that, a warning is not limited to a warning that is given by displaying information.

The vacuum chamber 14, the sensor unit 16, the control section 19, a part of the initial exhaust pipe 47, the gas sensor for initial exhaust 48, the initial exhaust valve 49, a part of the inspection exhaust pipe 51, the flow control valves 52a and 52b, the flowmeter 53 and the inspection exhaust valve 54 are arranged inside the clean booth 17. In the clean booth 17, an internal space in which the aforementioned devices and the like are disposed is isolated from the outside. A filter fan unit 17a is provided in the ceiling of the clean booth 17. Dry air whose temperature and humidity have been made constant which is supplied from an air-conditioning unit 64 is supplied into the clean booth 17 through the filter fan unit 17a. The interior of the clean booth 17 is pressurized to a positive pressure by the supply of dry air from the air-conditioning unit 64, thereby preventing the inflow of contaminated air from outside. A fan, a HEPA filter that filters dust such as powder dust, and an activated carbon filter that adsorbs solvent substances are provided in the filter fan unit 17a.

Because the principal components of the inspection device 10 are disposed inside the clean booth 17 as described above, the inspection device 10 eliminates fluctuations between inspection results that are due to the influence of temperature, humidity or solvent gas contained in the atmosphere, and thus increases the reliability of inspection results. The clean booth 17 is provided with a gas sensor 65 that monitors the atmosphere inside the clean booth 17. If solvent gas in the atmosphere inside the clean booth 17 exceeds a predetermined concentration, the control section 19 issues a warning by displaying information to that effect on the display panel 62b. Note that, a configuration may also be adopted in which the gas sensor 65 is used to detect the concentration of solvent gas in the atmosphere inside the clean booth 17, and an offset calculation is then performed to offset the amount of the solvent gas concentration from the detection results of the sensor unit 16 and the gas sensor for initial exhaust 48 to perform a determination with respect to the airtightness of the lithium ion battery 11.

The control section 19 includes an interface circuit (not illustrated), and is capable of connecting with an external PC 66 through the interface circuit. Special purpose software is installed in the PC 66, and the software can record information such as inspection results obtained by the inspection device 10 as well as various setting values, pressure changes and flow rate changes.

Figure 2:
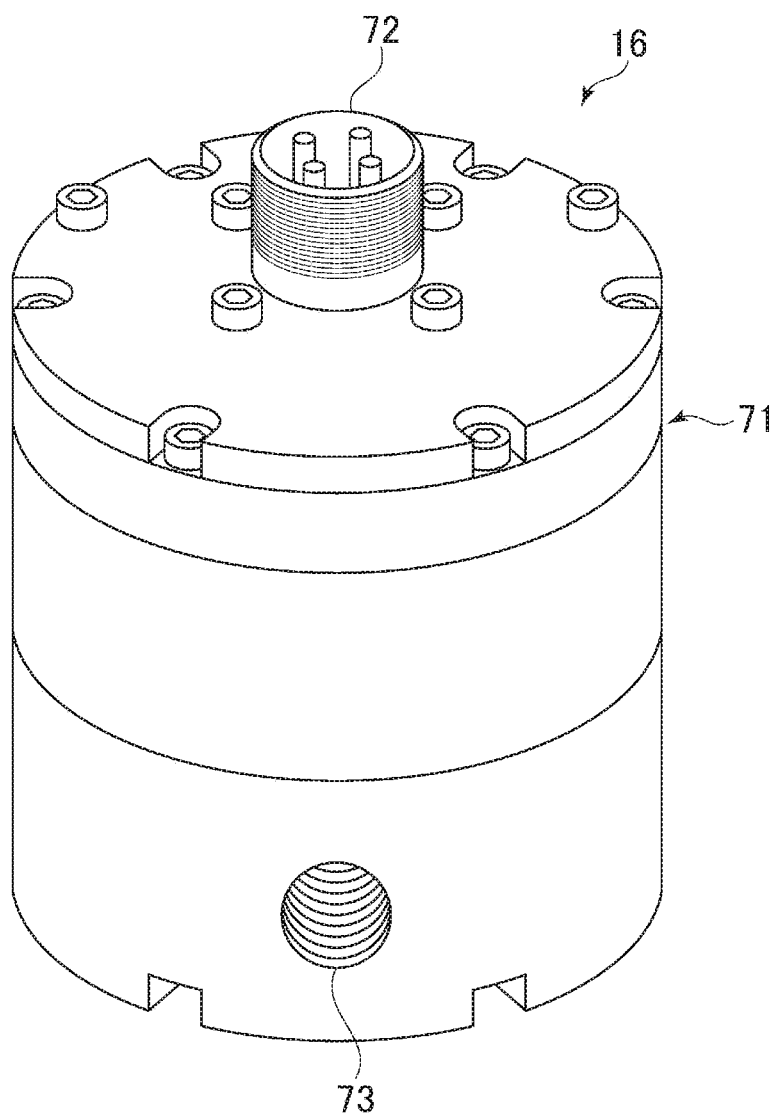
FIG. 2 is a perspective view illustrating the external appearance of a sensor unit.

FIG. 2 is a view illustrating the sensor unit 16, in which the aforementioned gas sensor 61 is contained inside a holder 71 that has a cylindrical shape. A connector 72 that is connected to the gas sensor 61 inside the holder provided on the top face of the holder 71. The gas sensor 61 is electrically connected to the control section 19 through the connector 72. A hermetic connector for making the inside of the holder airtight is used as the connector 72.

An inlet port 73 is provided in the circumferential face of the holder 71, and a first exhaust port 74 (see FIG. 5) and a second exhaust port 75 (see FIG. 5) are respectively provided at a portion of the circumferential face that is on the opposite side to the inlet port 73. The forms of usage of the sensor unit 16 are a first mode that uses the first exhaust port 74, and a second mode that uses the second exhaust port 75, and in this way the first exhaust port 74 and the second exhaust port 75 are selectively used. The exhaust port that is used among the first exhaust port 74 and the second exhaust port 75 is the exhaust port to which the inspection exhaust pipe 51 is connected, and the exhaust port that is not used is airtightly blocked using, for example, a screw.

The inspection exhaust pipe 51 on the inspection exhaust port 32 side is connected to the inlet port 73, and at the time of an inspection exhaust, exhaust gas from inside the vacuum chamber 14 is introduced into the interior of the holder 71 from the inlet port 73. Various flow channels through which exhaust gas flows are formed in the holder interior, and exhaust gas passes along the flow channels and is discharged from the first exhaust port 74 or the second exhaust port 75. The gas sensor 61 is provided partway along the flow channels.

Figure 3:
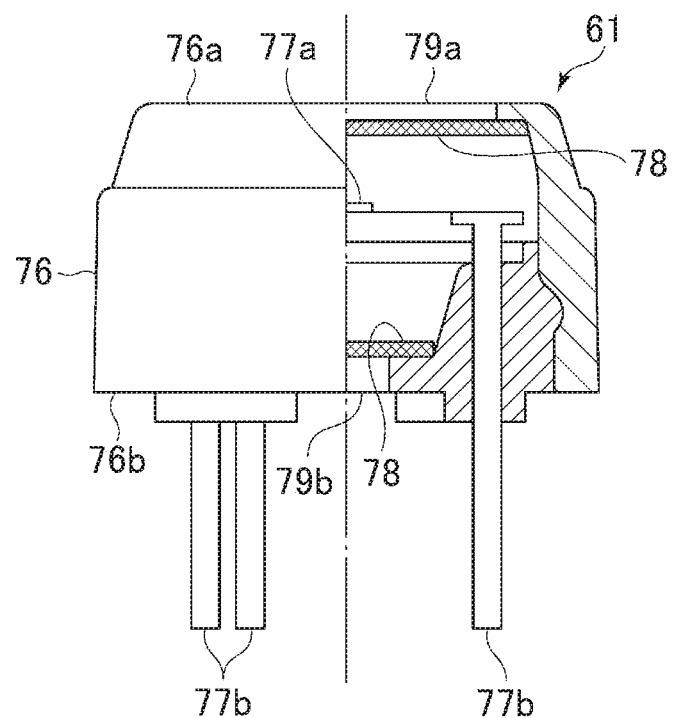
FIG. 3 is a partial cross-sectional view illustrating the structure of a gas sensor that is used in the sensor unit.

FIG. 3 illustrates an example of the gas sensor 61 that is used in the sensor unit 16. A base plate 77a on which a gas-sensitive element 61a and a heater 61b (both illustrated in FIG. 4) are provided is arranged in the gas sensor 61. The gas-sensitive element 61a reacts with a solvent gas inside a hollow case 76. The gas-sensitive element 61a is made of, for example, tin oxide ($SnO_2$). In this example, openings 79a and 79b that are covered with a metal mesh 78 are provided in a sensor face (upper face) 76a and a bottom face 76b (face on a terminal 77b side) of the case 76. The openings 79a and 79b are used as portions that can allow exhaust gas to pass through the inside of the case 76. In this example, the openings 79a and 79b are a first and a second opening. As the gas sensor 61 that can allow exhaust gas to pass through the inside of the case 76, apart from the bottom face 76b, for example, a structure may be used in which the second opening is provided in the circumferential face of the case 76.

Figure 4:
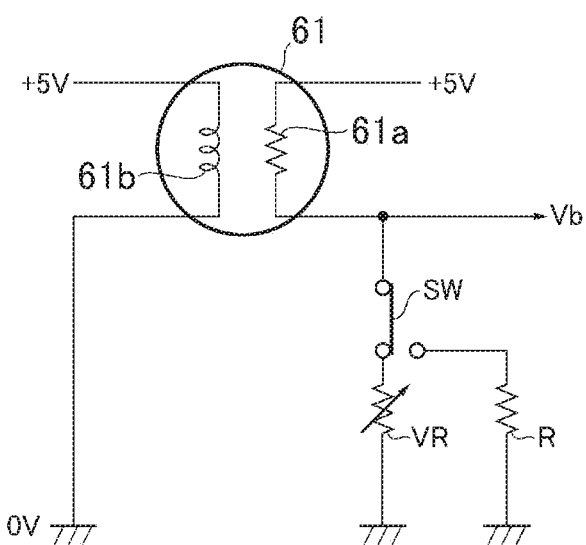
FIG. 4 is a circuit diagram illustrating an equivalent circuit of the gas sensor.

As illustrated in an equivalent circuit in FIG. 4, in the gas sensor 61, a variable resistance VR is connected in series to the gas-sensitive element 61a, and the end-to-end voltage of the variable resistance VR is adopted as the output voltage Vb. As the amount of solvent gas increases, the internal resistance of the gas sensor 61, that is, the resistance of the gas-sensitive element 61a, decreases and the output voltage Vb increases. The output voltage Vb can be calibrated by altering the resistance value of the variable resistance VR. Note that, a switch SW is normally connected to the variable resistance VR, and the switch SW is connected to a fixed resistance R when checking the state of deterioration of the gas sensor 61. The internal resistance of the gas sensor 61 tends to decrease as deterioration of the gas sensor 61 progresses. The state of deterioration of the gas sensor 61 can be known by acquiring the end-to-end voltage (output voltage Vb) of the fixed resistance R that is obtained when the gas sensor 61 is under a clean environment or when a gas containing a predetermined component is caused to flow through the gas sensor 61 as exhaust gas. For example, when the concentration of a solvent gas in the atmosphere inside the clean booth 17 that is measured by the gas sensor 65 that is provided in the clean booth 17 is within a certain reference range, the gas sensor 61 can be regarded as being under a clean environment.

Figure 5:
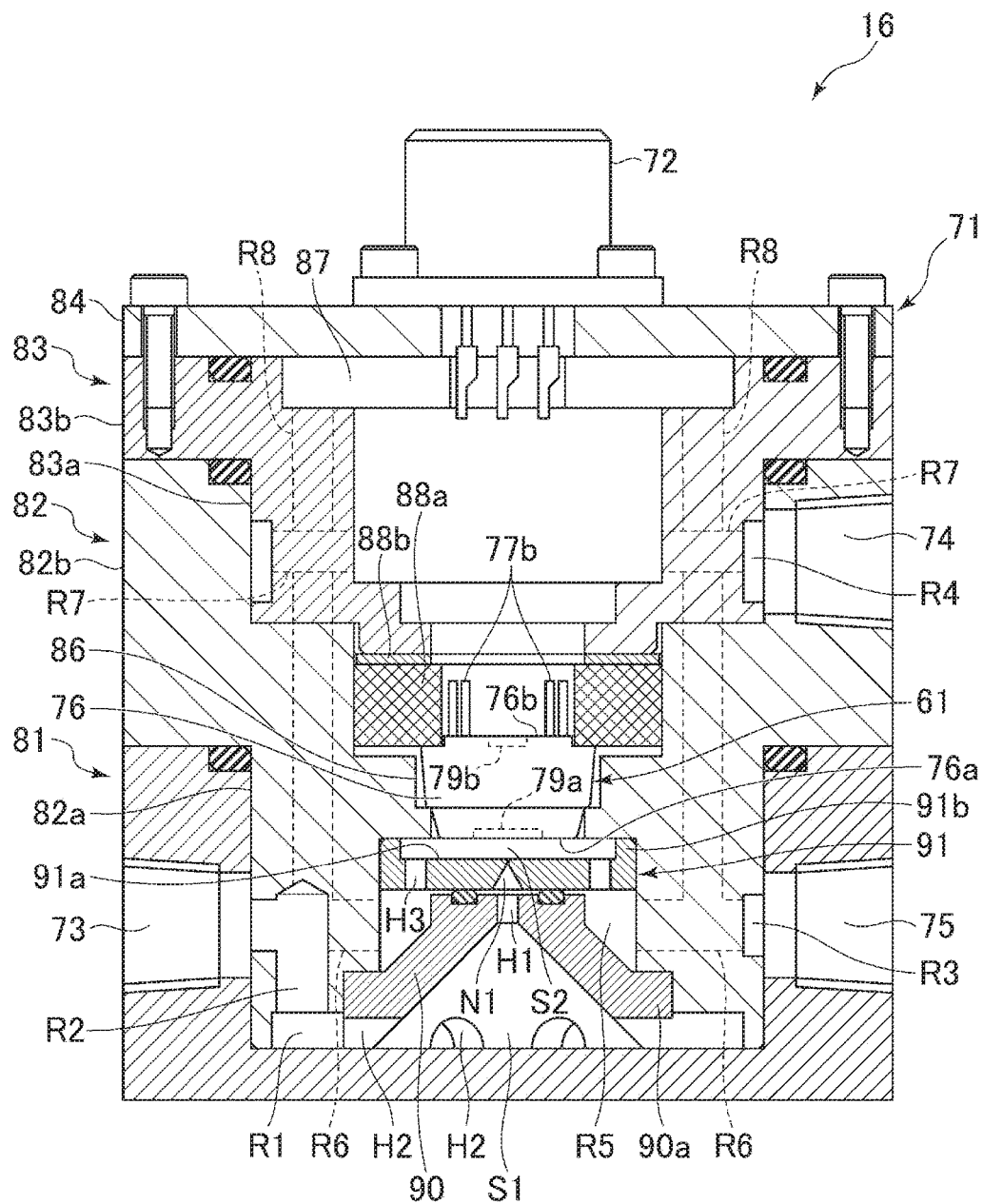
FIG. 5 is a cross-sectional view illustrating the configuration of the sensor unit.

As illustrated in FIG. 5, the holder 71 is constituted by a holder base 81, a sensor holder 82, a sensor retainer 83, a connector holder 84, and the aforementioned connector 72 and the like. The holder base 81 has a bottomed cylindrical shape. The inlet port 73 and the second exhaust port 75 are formed in the holder base 81 by penetrating the peripheral wall thereof. The sensor holder 82 has a small-diameter portion 82a and a large-diameter portion 82b. The large-diameter portion 82b is formed above the small-diameter portion 82a and has a larger external diameter than the small-diameter portion 82a. The small-diameter portion 82a and the large-diameter portion 82b are each a cylindrical shape. The external diameter of the small-diameter portion 82a is the same as the inner diameter of the holder base 81. The sensor holder 82 is mounted in a state in which the small-diameter portion 82a is fitted inside the holder base 81. The external diameter of the large-diameter portion 82b is the same as the external diameter of the holder base 81. The first exhaust port 74 is formed in the large-diameter portion 82b by penetrating the peripheral wall thereof.

A groove is formed in the circumferential direction in the lower end face of the small-diameter portion 82a. An annular flow channel R1 is formed by the aforementioned groove and the bottom of the holder base 81. Further, in the peripheral wall of the small-diameter portion 82a, an L-shaped flow channel R2 is formed in which one end is connected to the aforementioned groove, and the other end is connected to the inlet port 73. In addition, a groove is formed in the circumferential direction in the circumferential face of the small-diameter portion 82a, and a flow channel R3 is formed by the groove and the inner circumferential face of the holder base 81. The flow channel R3 is cut at the portion of the flow channel R2 to thereby form a C shape. The second exhaust port 75 opens at the inner circumferential face of the holder base 81, and is connected to the flow channel R3.

A hollow interior of the small-diameter portion 82a serves as a mounting hole 86 for the gas sensor 61. In the gas sensor 61 that is used in this example, the diameter of the case 76 thereof on the bottom face 76b side is larger than on the sensor face 76a side. Therefore, by causing a shoulder part which is formed by making the inner diameter on the lower end side of the mounting hole 86 smaller to engage with the case 76 of the gas sensor 61, the gas sensor 61 is positioned so that, for example, the sensor face 76a and the lower end face of the mounting hole 86 match. In the gas sensor 61 that is within the mounting hole 86, the bottom face 76b thereof is pressed by a lower end part of the sensor retainer 83 through a donut-shaped sponge cushion 88a and retainer plate 88b. Thereby, the gas sensor 61 is fixed in the holder 71 without blocking the opening 79a on the sensor face 76a side and the opening 79b on the bottom face 76b side. Note that, a configuration is adopted so that a gap does not arise between the case 76 of the gas sensor 61 and the small-diameter portion 82a, and so that exhaust gas does not pass around the circumference of the gas sensor 61 and escape into a hollow section 87.

The sensor retainer 83 has a small-diameter portion 83a, and a large-diameter portion 83b which is formed above the small-diameter portion 83a and which has a larger external diameter than the small-diameter portion 83a. The small-diameter portion 83a and the large-diameter portion 83b are each a cylindrical shape. The external diameter of the small-diameter portion 83a is the same as the inner diameter of the large-diameter portion 82b of the sensor holder 82. The small-diameter portion 83a is fitted inside the large-diameter portion 82b of the sensor holder 82 to thereby mount the sensor retainer 83 onto the sensor holder 82.

A groove is formed in the circumferential direction in the outer circumferential face of the small-diameter portion 83a. An annular flow channel R4 is formed by the aforementioned groove and the inner circumferential face of the large-diameter portion 82b of the sensor holder 82. The first exhaust port 74 opens in the inner circumferential face of the sensor holder 82 and is connected to the flow channel R4.

The connector holder 84 is mounted at an upper portion of the large-diameter portion 83b. The connector 72 is mounted to the connector holder 84, and the hollow section 87 of the sensor retainer 83 which communicated with the mounting hole 86 is thereby airtightly closed. Wiring that connects the connector 72 and terminals 77b of the gas sensor 61 is arranged in the hollow section 87. The hollow section 87 is also used as a flow channel which communicates with the inside of the gas sensor 61 by being directly connected to the opening 79b that is the second opening on the bottom face 76b side of the gas sensor 61, and through which exhaust gas that passed through the inside of the gas sensor 61 passes. Thus, the hollow section 87 is configured so that gas that passed through the interior of the case 76 of the gas sensor 61 flows into the hollow section 87.

A plurality of flow channels R6 that connect the flow channel R3 and a flow channel R5 are formed in the peripheral wall of the small-diameter portion 82a of the sensor holder 82. The respective flow channels R6 are provided at appropriate intervals in the circumferential direction of the small-diameter portion 82a, and are connected to the flow channel R3 at positions that are different from the position at which the second exhaust port 75 is connected thereto. Further, a plurality of flow channels R7 that connect the hollow section 87 and the flow channel R4 are formed in the peripheral wall of the small-diameter portion 83a of the sensor retainer 83. The respective flow channels R7 are provided at appropriate intervals in the circumferential direction of the small-diameter portion 83a, and are connected to the flow channel R4 at positions that are different from the position at which the first exhaust port 74 is connected thereto. In the present example, four each of the flow channels R6 and R7 are provided. In addition, a plurality of flow channels R8 that connect the hollow section 87 and the respective flow channels R6 are formed in the peripheral walls of the sensor holder 82 and the sensor retainer 83. The positions of the flow channels R6 and the flow channels R8 in the circumferential direction of the holder 71 are arranged so as to deviate from the positions of the flow channels R7, and thus the flow channels R8 are formed so as to avoid the flow channels R7. Accordingly, the flow channels R7 and the flow channels R8 are not directly connected.

A ventilation plate retainer 90 is formed in a substantially truncated cone shape, and is arranged at the center of the bottom part within the holder base 81. The ventilation plate retainer 90 is positioned and fixed by a flange 90a which is formed at the peripheral edge of a lower portion thereof being pressed by a shoulder part that is provided at the lower end of the sensor holder 82. A flow channel R5 that runs completely around the outer circumference of the ventilation plate retainer 90 is formed between the outer circumferential face of the ventilation plate retainer 90 and the inner circumferential face of the small-diameter portion 82a of the sensor holder 82.

A conical space portion S1 is formed by a conical concave portion formed in the undersurface of the ventilation plate retainer 90 and the bottom of the holder base 81. A throughhole H1 having a diameter of, for example, several mm is formed in the upper portion of the ventilation plate retainer 90. A through-hole H2 that connects the flow channel R1 and the conical space portion S1 is formed in the flange 90a. For example, four of the through-holes H2 are provided at appropriate intervals in the circumferential direction of the flange 90a. Exhaust gas is smoothly supplied through the conical space portion S1 and the through-hole H1 to a nozzle N1 that is described later.

A ventilation plate 91 as a supply section is sandwiched between the top face of the ventilation plate retainer 90 and the sensor holder 82. An O-ring is inserted between the ventilation plate retainer 90 and the ventilation plate 91. The ventilation plate 91 has a disk section 91a and a rib 91b that is provided around the disk section 91a.

The nozzle N1 is formed as a supply port at the center of the disk section 91a, and a plurality of through-holes H3 are formed at the circumference of the disk section 91a. The nozzle N1 opens in the upper face of the disk section 91a and allows exhaust gas to pass through to the sensor face 76a side, and causes the exhaust gas to flow toward the sensor face 76a. The rib 91b is provided so as to project to the gas sensor 61 side. The rib 91b contacts against the lower end face of the mounting hole 86. Thereby, in the ventilation plate 91, the upper face of the disk section 91a as an opposing surface is held so as to oppose the sensor face 76a of the gas sensor 61 with a predetermined clearance therebetween. Thus, a clearance S2 is formed between the sensor face 76a and the upper face of the disk section 91a, and the state is one in which the nozzle N1 is brought close to the sensor face 76a.

The nozzle N1 is provided at a position that opposes the center of the sensor face 76a of the gas sensor 61, and causes exhaust gas to flow perpendicularly toward the sensor face 76a. Thus, by holding the nozzle N1 at a position close to the sensor face 76a and causing exhaust gas to flow from the nozzle N1 toward the sensor face 76a, the exhaust gas is effectively introduced inside the case 76 of the gas sensor 61 and the detection accuracy is enhanced. Further, in this example, by causing exhaust gas to pass through the inside of the case 76 as described later, the exhaust gas is introduced more effectively inside the case 76 and the detection accuracy is further enhanced.

Note that the clearance between the nozzle N1 and the sensor face 76a is preferably 1 mm or less, and particularly preferably is 0.5 mm or less. Further, the clearance between the nozzle N1 and the sensor face 76a may be 0 mm, that is, the upper face of the disk section 91a and the sensor face 76a may closely contact. In addition, it is favorable to determine the position of the nozzle N1 so that the exhaust gas strikes against the opening 79a provided in the sensor face 76a. In this example, the opening 79a is provided at the center of the sensor face 76a, and the nozzle N1 is provided at a position facing the opening 79a.

The nozzle N1 is a so-called "nozzle shaped" supply port whose inner diameter gradually decreases from the ventilation plate retainer 90 side toward the gas sensor 61 side. In this example, the diameter of the tip (gas sensor 61 side) of the nozzle N1 is 0.2 mm. Thereby, the flow rate of exhaust gas that is caused to flow toward the sensor face 76a is reduced. Note that, the shape of the supply port is not limited to the aforementioned shape, and may be a nozzle shape whose diameter gradually increases toward the gas sensor 61 side, or may be a hole shape in which the diameter is made constant.

As described above, the sensor unit 16 has a first mode that uses the first exhaust port 74, and a second mode that uses the second exhaust port 75. In the first mode, as illustrated schematically in FIG. 6, the second exhaust port 75 and the respective flow channels R8 are placed in a blocked state using a screw or the like. In the first mode, as indicated by arrows showing the flow in FIG. 6, exhaust gas that flows in from the inlet port 73 is supplied to the nozzle N1 through the flow channel R2, the flow channel R1, the respective through-holes H2, the conical space portion S1 and the through-hole H1. The exhaust gas supplied to the nozzle N1 that is provided partway along the flow channel in this way flows toward the sensor face 76a of the gas sensor 61 through the clearance S2 from the nozzle N1 to flow perpendicularly onto the sensor face 76a. The exhaust gas that flowed toward the sensor face 76a passes through the inside of the gas sensor 61 and comes out therefrom into the hollow section 87. The exhaust gas that comes out into the hollow section 87 flows from the respective flow channels R7 into the flow channel R4, and flows from the flow channel R4 to the first exhaust port 74 and is discharged.

In the first mode, the path which the exhaust gas that passed through the inside of the gas sensor 61 reaches the first exhaust port 74, that is, the hollow section 87 and the flow channels R7 and R4, is a first discharge flow channel. In the first discharge flow channel, the hollow section 87 is not connected directly to the first exhaust port 74, and instead is connected to the first exhaust port 74 through the plurality of flow channels R7 that are provided as described above and the annular flow channel R4 to thereby stabilize the flow of exhaust gas inside the gas sensor 61 and suppress the occurrence of fluctuations in the detection accuracy.

Figure 7:
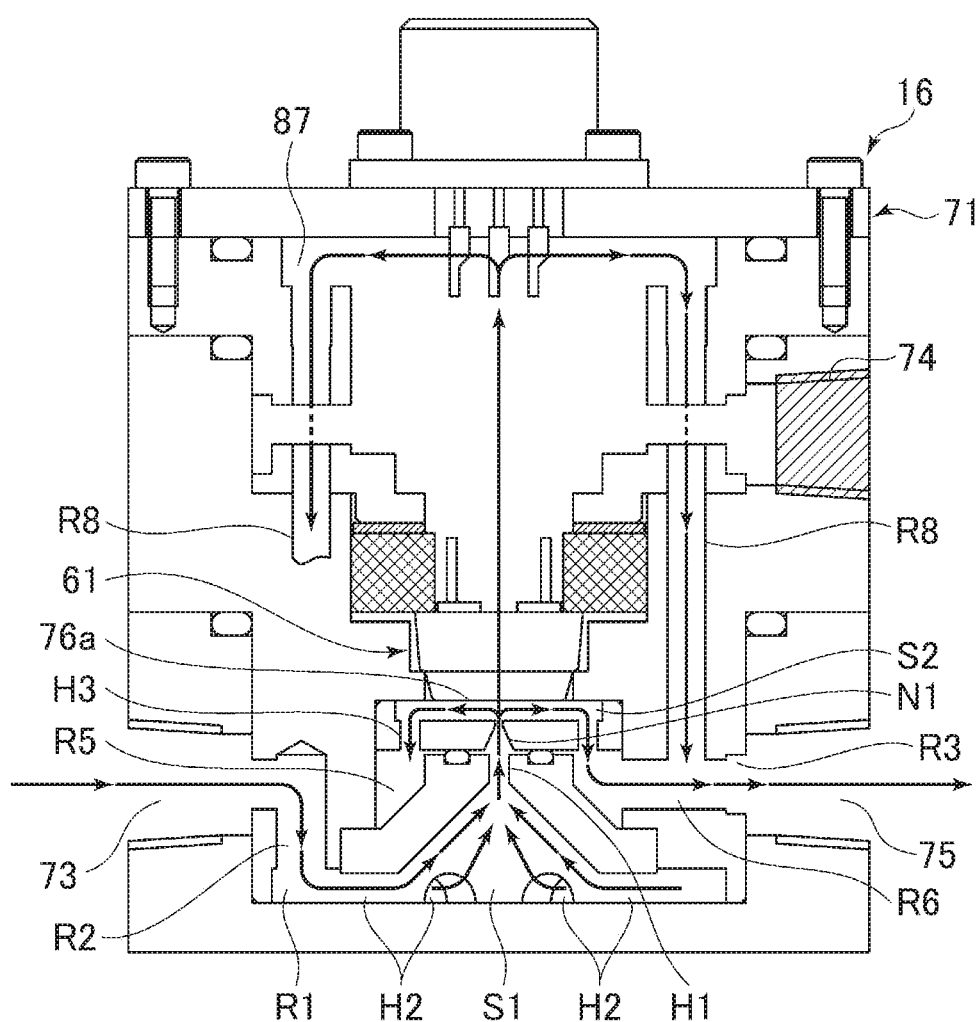
FIG. 7 is an explanatory drawing illustrating the flow of exhaust gas inside the sensor unit in a second mode.

In the second mode, as illustrated schematically in FIG. 7, the first exhaust port 74 is placed in a blocked state using a screw or the like. In the second mode also, exhaust gas that flows in from the inlet port 73 is supplied to the nozzle N1, and is caused to flow toward the sensor face 76a of the gas sensor 61 so as to flow perpendicularly onto the sensor face 76a. The path along which the exhaust gas flows until reaching the sensor face 76a is the same as in the case of the first mode. In the second mode, a part of the exhaust gas that flowed toward the sensor face 76a passes through the inside of the gas sensor 61 and comes out therefrom into the hollow section 87, and passes through the respective flow channels R8 from the hollow section 87 and flows to the respective flow channel R6. The remaining exhaust gas flows along the sensor face 76a inside the clearance S2 and flows to the through-hole H3, the flow channel R5, and the respective flow channels R6. The exhaust gas that flows into the respective flow channels R6 passes through the flow channel R3 and is discharged from the second exhaust port 75.

In the second mode, the path which the exhaust gas that passed through the inside of the gas sensor 61 reaches the second exhaust port 75, that is, the hollow section 87 and the flow channels R8, R6 and R3, is a first discharge flow channel. Further, the path from the clearance S2 until the second exhaust port 75, that is, the through-hole 83 and the flow channels R5, R6 and R3, is a second discharge flow channel. In this example, the clearance S2 is a relief flow channel that allows some exhaust gas that does not pass through inside of the gas sensor 61 to escape. In the first discharge flow channel in the second mode, the hollow section 87 is also not connected directly to the second exhaust port 75, and instead is connected to the second exhaust port 75 through the plurality of flow channels R8 and R6 that are provided as described above and the annular flow channel R3 to thereby stabilize the flow of exhaust gas inside the gas sensor 61 and suppress the occurrence of fluctuations in the detection accuracy.

The aforementioned first and second modes are each modes that cause exhaust gas to pass through the inside of the gas sensor 61 from the nozzle N1, and which introduce exhaust gas into the inside of the gas sensor 61 more effectively to increase the detection accuracy. That is, by causing exhaust gas to pass through the inside of the gas sensor 61, exhaust gas is not allowed to stay inside the gas sensor 61 and the output voltage Vb changes in accordance with the concentration of solvent gas in the exhaust gas flowing through the inspection exhaust pipe 51, and therefore even in a case where the amount of leakage of solvent gas is small and the concentration of the solvent gas is low, the leakage is detectable.

The first mode is a mode that causes all of the exhaust gas from the nozzle N1 to pass through the inside of the gas sensor 61, and is a mode that, by supplying all of the exhaust gas into the inside of the gas sensor 61, increases the amount of solvent gas supplied into the gas sensor 61 and thereby increases the reacting weight of the gas sensor 61. For example, the first mode is suitable for a case where a solvent for which the reactivity with respect to the gas sensor 61 is low is used as the principal constituent for the electrolyte of the lithium ion battery 11.

On the other hand, the second mode is a mode that causes a part of the exhaust gas from the nozzle N1 to flow inside the gas sensor 61, and is suitable for a case where a solvent for which the reactivity with respect to the gas sensor 61 is comparatively high is the principal constituent of the electrolyte of the lithium ion battery 11, or a case where it is necessary to reduce a temperature decrease in the gas-sensitive element 61a caused by exhaust gas passing through the inside of the gas sensor 61.

Note that, the above described configuration of the sensor unit 16 is one example, and the configuration of the sensor unit 16 is not limited thereto. For example, although in the present embodiment the supply section is provided as a single ventilation plate 91, the supply section may be provided integrally with another member of the holder 71. Further, although the sensor unit 16 has a configuration that enables selection between the first mode and the second mode, the sensor unit 16 may have a configuration that corresponds to either one of the first mode and second mode only.

As described above, since the sensor unit 16 is interposed in the inspection exhaust pipe 51 of the vacuum chamber 14 and is arranged outside the vacuum chamber 14, switching between the first and second modes can be easily performed.

Next, the actions of the above described configuration will be described. Prior to performing an inspection regarding the airtightness of the lithium ion battery 11, the sensor unit 16 is set of either one of the first mode and the second mode, and the inspection exhaust pipe 51 is connected to an exhaust port that corresponds to the mode that is set.

Figure 6:
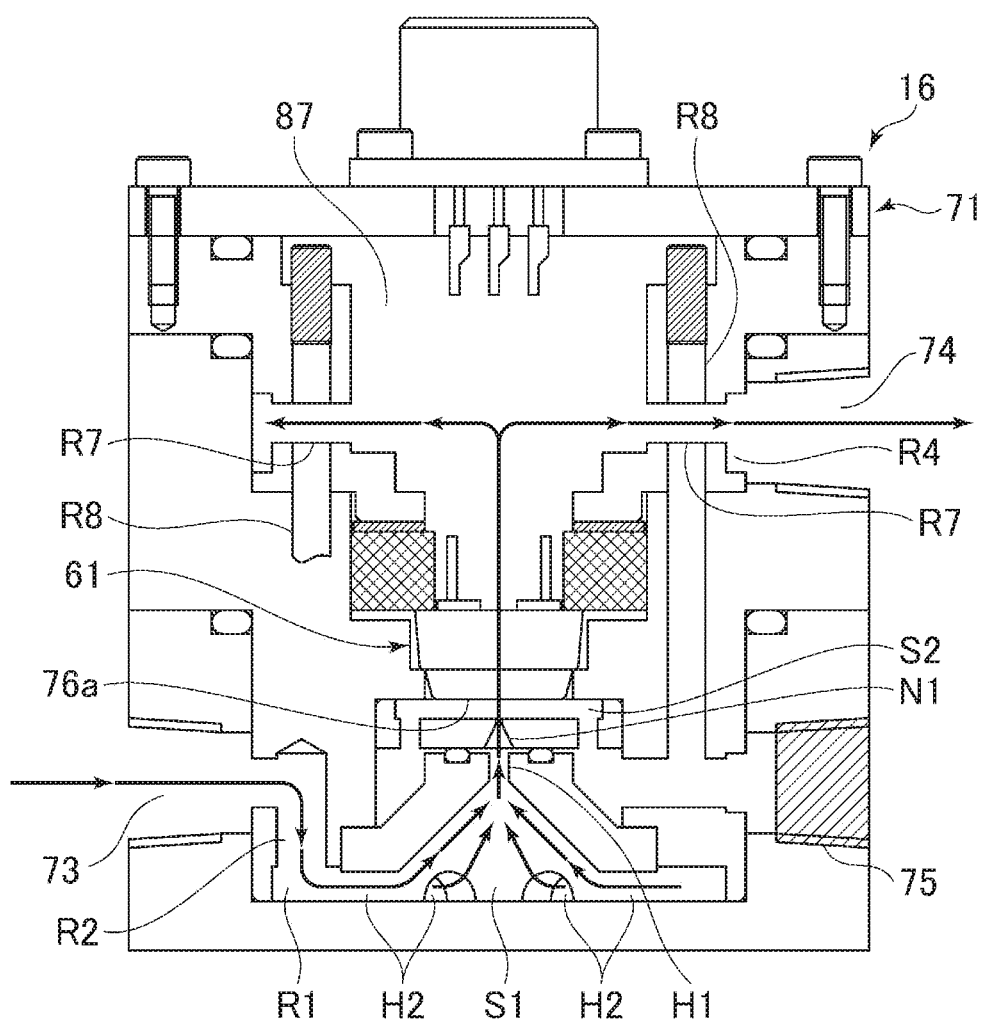
FIG. 6 is an explanatory drawing illustrating the flow of exhaust gas inside the sensor unit in a first mode.

For example, in a case where the first mode is set, as illustrated in FIG. 6, the second exhaust port 75 is blocked and each of the flow channels R8 are also blocked. Further, the inspection exhaust pipe 51 on the downstream side (flow control valve 52b side) is connected to the first exhaust port 74.

Next, the lithium ion battery 11 that is the test object is housed inside the vacuum chamber 14. First, the door 21 of the vacuum chamber 14 is opened in a state in which the inside of the vacuum chamber 14 has been made atmospheric pressure, and the lithium ion battery 11 is housed inside the vacuum chamber 14. Thereafter, the door 21 of the vacuum chamber 14 is closed, and the operation panel 62 is then operated to instruct the start of the inspection.

Figure 8:
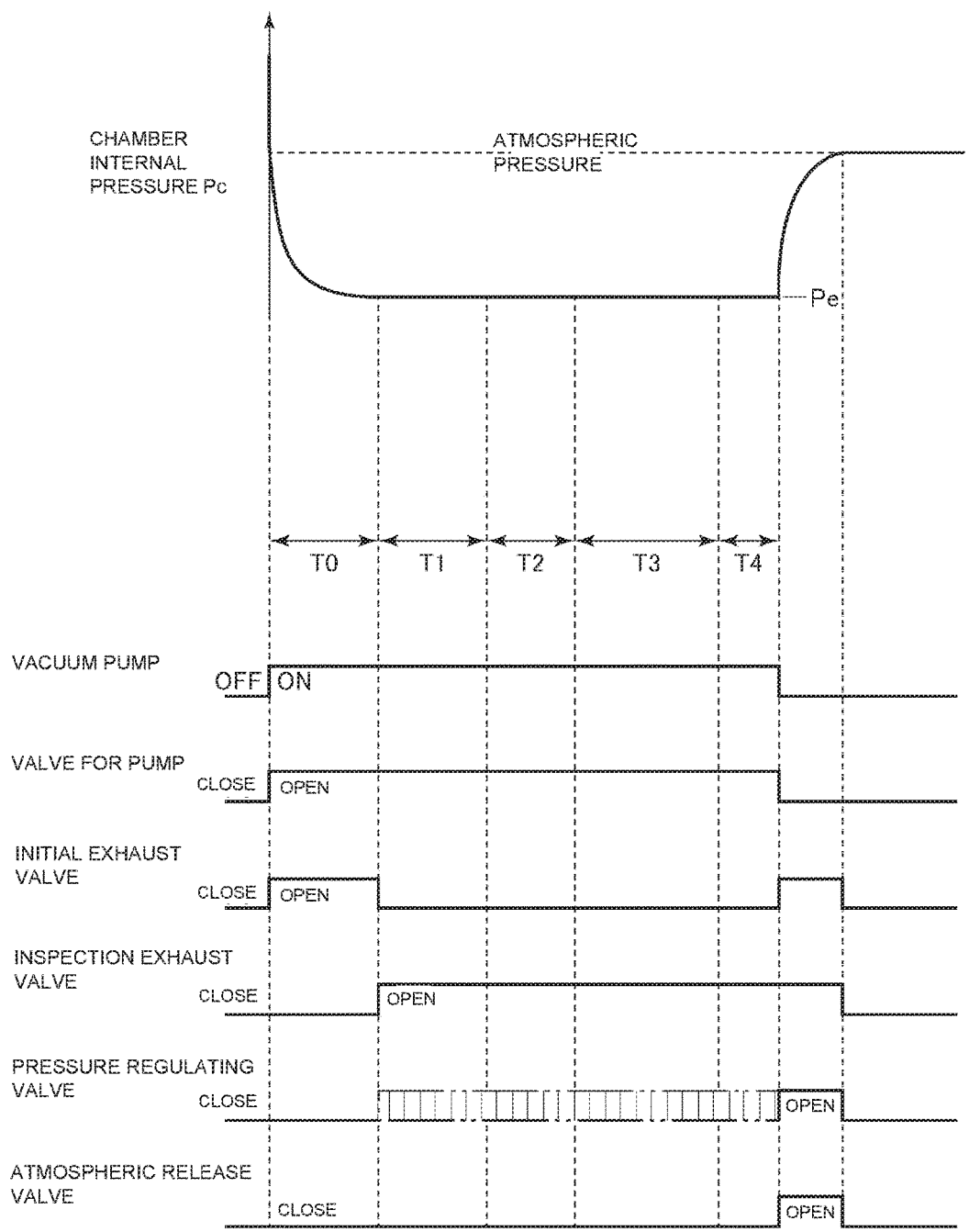
FIG. 8 is a timing chart for inspection of airtightness.

Upon an instruction being made to start the inspection, after confirming that each of the atmospheric release valve 26, the valve for pump 42, the pressure regulating valve 44, the initial exhaust valve 49 and the inspection exhaust valve 54 is closed, the control section 19 places the gas sensors 48 and 61 in an operating state. Next, as illustrated in FIG. 8, the control section 19 activates (turns on) the vacuum pump 18. The valve for pump 42 and the initial exhaust valve 49 are then opened by the control section 19. As a result, gas that is inside the vacuum chamber 14 is sucked out as exhaust gas through the initial exhaust port 31 and the initial exhaust pipe 47 to thereby perform an initial exhaust, and the chamber internal pressure Pc gradually decreases.

In the T0 period in which the initial exhaust is being performed, the output voltage Va of the gas sensor for initial exhaust 48 is referred to by the control section 19. At the start of an initial exhaust, the control section 19 acquires the output voltage Va at the start of the initial exhaust as a reference voltage. Thereafter, each time the output voltage Va is obtained from the gas sensor for initial exhaust 48, the control section 19 determines the amount of increase in the output voltage Va relative to the reference voltage, and compares the determined amount of increase with a allowable voltage increase range ΔV0. In a case where the amount of increase in the output voltage Va has become equal to or greater than the allowable voltage increase range ΔV0, the control section 19 determines that the airtightness of the lithium ion battery 11 is defective, and issues a warning by displaying information to that effect on the display panel 62*b* and also interrupts and ends the inspection. On the other hand, in the case when the amount of increase in the output voltage Va is less than the allowable voltage increase range ΔV0, the control section 19 continues the initial exhaust. Since only the vacuum chamber 14 that houses the lithium ion battery 11 need be subjected to the initial exhaust, the time that is required for the initial exhaust is shortened compared to the conventional two-layer type inspection device, and this is advantageous for shortening the inspection time.

Further, during the initial exhaust, the control section 19 monitors the chamber internal pressure Pc that is being measured by the pressure gauge 27. When the chamber internal pressure Pc reaches the inspection pressure Pe, the control section 19 closes the initial exhaust valve 49 to end the initial exhaust, and also opens the inspection exhaust valve 54 to start an inspection exhaust. Further, the control section 19 starts control to open/close the pressure regulating valve 44 so that a difference between the chamber internal pressure Pc and the pipe internal pressure Pt that is being measured with the pressure gauge 43 becomes constant. Note that, in a case where the chamber internal pressure Pc does not reach the inspection pressure Pe even after a predetermined setting time passes from the start of the initial exhaust, the control section 19 determines that there is a problem with the airtightness of the vacuum chamber 14, and issues a warning by displaying information to that effect on the display panel 62*b*.

By opening the inspection exhaust valve 54, gas inside the vacuum chamber 14 is sucked out as exhaust gas from the inspection exhaust port 32 into the inspection exhaust pipe 51, and flows toward the common pipe 41 through the inspection exhaust valve 54, the flow control valve 52*a*, the sensor unit 16 and the flow control valve 52*b*.

As described above, in the inspection exhaust, exhaust gas flows to the sensor unit 16, and that exhaust gas flows into the sensor unit 16 from the inlet port 73. The exhaust gas that flows into the sensor unit 16 passes through the flow channel R2, the flow channel R1 and the respective through-holes H2 and flows into the conical space portion S1. The exhaust gas that flows into the conical space portion S1 is then supplied to the nozzle N1 from the through-hole H1 in the upper part of the conical space portion S1, and the flow rate of the exhaust gas is reduced by the nozzle N1 and the exhaust gas is emitted therefrom. The emitted exhaust gas is caused to flow toward the sensor face 76*a* of the gas sensor 61 through the clearance S2. At this time, the exhaust gas from the nozzle N1 flows perpendicularly onto the sensor face 76*a* and is transmitted through the metal mesh 78 provided in the sensor face 76*a* and flows into the case 7. The exhaust gas is then transmitted through the metal mesh 78 on the bottom face 76*b* side and comes out into the hollow section 87. The exhaust gas is discharged from the first exhaust port 74 through the flow channels R7 and R4 from the hollow section 87.

The output voltage Vb of the gas sensor 61 changes according to the concentration contained in the exhaust gas that passes through the inside of the gas sensor 61 in the manner described above. The control section 19 refers to the output voltage Vb of the gas sensor 61 during the inspection exhaust.

In this connection, a large amount of exhaust gas flows in the initial exhaust that is performed prior to the inspection exhaust, and if the large amount of exhaust gas flows into the sensor unit 16, the temperature of the gas-sensitive element 61*a* that is being heated by the heater 61*b* inside the gas sensor 61 will be unstable, and consequently the output voltage Vb will be unstable. Therefore, detection of a solvent gas by the sensor unit 16 cannot be performed immediately after completion of the initial exhaust, and this is a factor that prolongs the inspection time period. However, in the present example, as described above, because the initial exhaust is performed using the initial exhaust pipe 47 that is provided separately from the inspection exhaust pipe 51 along which the sensor unit 16 is provided, detection of solvent gas by the sensor unit 16 can be started immediately after completion of the initial exhaust.

In the T1 period that is the first period of the inspection exhaust, the control section 19 adopts the output voltage Vb at the time that the inspection exhaust starts as the reference voltage, and each time the output voltage Vb is obtained from the gas sensor 61, the control section 19 determines the amount of increase in the output voltage Vb with respect to the reference voltage, and compares the amount of increase and a allowable voltage increase range ΔV1 for the T1 period. For example, as a result of this comparison, in a case where the result of the aforementioned comparison indicates that the amount of increase in the output voltage Vb is smaller than the allowable voltage increase range ΔV1, the control section 19 continues the inspection.

In the case when the inspection is continued and the T1 period ends and the T3 period is entered, the control section 19 adopts the lowest output voltage Vb obtained during the T1 period as a new reference voltage, and similarly to the T1 period, each time the output voltage Vb is obtained from the gas sensor 61, the control section 19 determines the amount of increase in the output voltage Vb with respect to the reference voltage, and compares the amount of increase and a allowable voltage increase range ΔV2 for the T2 period. If the result of the aforementioned comparison indicates that the amount of increase in the output voltage Vb is smaller than the allowable voltage increase range ΔV2, the inspection is continued. When the T2 period ends and the T2 period is entered, the control section 19 adopts the lowest output voltage Vb obtained throughout the T1 period and the T2 period as a new reference voltage, and similarly to the T1 period and T2 period, compares the amount of increase in the output voltage Vb and a allowable voltage increase range ΔV3 for the T3 period. In addition, in the T4 period that follows the T3 period, the control section 19 adopts the lowest output voltage Vb obtained throughout the periods from the T1 period to the T3 period as a new reference voltage, and compares the amount of increase in the output voltage Vb and a allowable voltage increase range ΔV4 for the T4 period.

In each of the periods from the T1 period to T4 period, in the case when the amount of increase in the output voltage Vb with respect to the reference voltage is less than the relevant allowable voltage increase range for each period, the control section 19 determines that there is no problem with respect to the airtightness of the lithium ion battery 11, and notifies information to that effect and then ends the inspection. When ending the inspection, the control section 19 closes the valve for pump 42, and also opens the pressure regulating valve 44 and stops (turns "off") the vacuum pump 18. The control section 19 also opens the initial exhaust valve 49 and the atmospheric release valve 26. By opening the atmospheric release valve 26, the atmosphere inside the clean booth 17 flows into the vacuum chamber 14 through the filter 28 and the atmospheric release valve 26, and the chamber internal pressure Pc rises to the atmospheric pressure. At a stage when the chamber internal pressure Pc that is being measured by the pressure gauge 27 becomes the atmospheric pressure, the control section 19 closes the atmospheric release valve 26, the initial exhaust valve 49 and the inspection exhaust valve 54.

By opening the atmospheric release valve 26 as described above, the atmosphere inside the clean booth 17 flows into the vacuum chamber 14, and in accompaniment therewith a rapid flow of gas arises in the initial exhaust pipe 47 and the inspection exhaust pipe 51, and therefore a temperature change occurs at the gas sensors 48 and 61 and the output voltages Va and Vb fluctuate. Consequently, after closing the atmospheric release valve 26, the control section 19 waits until the output voltages Va and Vb of the gas sensors 48 and 61 stabilize, and then enters a stand-by state for the next inspection. Because the atmosphere inside the clean booth 17 that was purified with the filter fan unit 17a is introduced into the vacuum chamber 14, the next inspection can be started without being affected by solvent gas contained in the atmosphere outside the clean booth 17.

On the other hand, if the amount of increase in the output voltage Vb with respect to the reference voltage is equal to or greater than the allowable voltage increase for the respective periods during any of the periods from the T1 period to the T4 period during the inspection exhaust, the control section 19 determines that there is a problem with respect to the airtightness of the lithium ion battery 11 that is under inspection. The control section 19 then displays information to the effect that the airtightness of the lithium ion battery 11 under inspection is defective on the display panel 62b, and ends the inspection at that time point.

As described above, at the sensor unit 16, even if the solvent gas contained in exhaust gas is a trace quantity, because the exhaust gas is passed through the inside of the gas sensor 61, the exhaust gas containing the solvent gas is supplied more effectively to the gas-sensitive element 61a, and hence the output voltage Vb of the gas sensor 61 significantly rises. Accordingly, even when the airtightness of the lithium ion battery 11 is defective due to an extremely small pinhole and the quantity of solvent gas that leaks out is a trace quantity, it is detected that the airtightness of the lithium ion battery 11 is defective. That is, high detection accuracy is obtained.

On the other hand, for example, in a case where a solvent for which the reactivity with respect to the gas sensor 61 is comparatively high is being used as the principal constituent for the electrolyte of the lithium ion battery 11, the sensor unit 16 is set to the second mode. In this case, the first exhaust port 74 is blocked. If the respective flow channels R8 are being blocked, the blockage of each of the flow channels R8 is removed. The inspection exhaust pipe 51 on the downstream side is then connected to the second exhaust port 75. Thereafter, the airtightness inspection is performed by the same procedures as in the case of the first mode.

In the case where the sensor unit 16 is set to the second mode, exhaust gas that flowed into the inside of the sensor unit 16 from the inlet port 73 is supplied to the nozzle N1 along the same path as in the case of the first mode, and the exhaust gas flows perpendicularly toward the sensor face 76a from the nozzle N1. A part of the exhaust gas then passes through the metal mesh 78 provided in the sensor face 76a and flows into the case 76, and passes through the metal mesh 78 on the bottom face 76b side and comes out into the hollow section 87, and is discharged from the second exhaust port 75 through the flow channels R8, R6 and R3 from the hollow section 87. The remaining exhaust gas flows through the inside of the clearance S2 along the sensor face 76a, and is discharged from the second exhaust port 75 via the through-hole H3 and the flow channels R5, R6 and R3.

In the second mode, although the flow rate of exhaust gas that passes through the inside of the gas sensor 61 is small, the reactivity of a solvent gas contained in the exhaust gas is high, and hence the output voltage Vb of the gas sensor 61 significantly increases. Accordingly, in this case also, a state in which the airtightness of the lithium ion battery 11 is defective can be detected with high detection accuracy.

Although in the above described embodiment the gas sensor 61 of a type in which it is possible for exhaust gas to pass through the inside of the case 76 is used, a gas sensor 61 of a type in which exhaust gas does not pass through the inside of the case 76 may also be used. Even when using such kind of gas sensor 61, by retaining the opening of the nozzle N1 at a position that is close to the sensor face 76a and causing the exhaust gas from the nozzle N1 to flow toward the sensor face 76a, the exhaust gas can be effectively introduced into the inside of the case 76 of the gas sensor 61 and the detection accuracy can be enhanced. Note that, in the case of using the aforementioned holder 71, the clearance S2 and the second exhaust port 75 are connected by the second discharge flow channel (through-hole H3 and flow channels R5, R6 and R3). In addition, since a discharge flow channel that guides exhaust gas that passed through the inside of case 76 to the exhaust ports 74 and 75 is not necessary, the respective flow channels R8 and the first exhaust port 74 are blocked.

Note that, in the case of evaluating the reliability of inspections performed by the inspection device 10 or performing adjustments thereto, the evaluation or adjustment can be performed by preparing a test container within which the same electrolyte as the electrolyte of the lithium ion battery 11 that is to be actually inspected is sealed and in which pinholes are formed, and housing the test container in the vacuum chamber 14. In this case, in order to perform correct evaluation and adjustment, it is good to make the test container the same size as the lithium ion battery 11 that is to be actually inspected.

It is possible for the above-described inspection device 10 to be made compatible with an automatic line facility. In this case, for example, an automatic opening/closing mechanism that uses an electromagnetic valve or a cylinder or the like can be adopted for opening and closing of the clean booth 17 and the vacuum chamber 14, and insertion and withdrawal of the lithium ion battery 11 can also be automated. In addition, it is possible to perform communication peripheral equipment through the interface circuit and cause the respective pieces of equipment to perform coordinated operations.

Although in the above described embodiment inspection of a single lithium ion battery 11 is performed per single inspection, inspection of a plurality of the lithium ion batteries 11 may be performed per single inspection by housing a plurality of the lithium ion batteries 11 inside the vacuum chamber 14. It is favorable to divide the inside of the vacuum chamber 14 into a plurality or compartments to enable identification of a lithium ion battery 11 whose airtightness is defective or narrowing down of lithium ion batteries 11 to identify a lithium ion battery 11 whose airtightness is defective. In a case where the inside of the vacuum chamber 14 is divided into a plurality of compartments, the inspection exhaust system 36 is provided for each compartment, and the sensor unit 16 is provided for each inspection exhaust pipe 51 of the inspection exhaust systems 36. Note that, with respect to the initial exhaust pipe 47, although the initial exhaust pipe 47 can be provided for each compartment, the initial exhaust pipe 47 can also be made common for the respective compartments. Although an example has been described above in which a lithium ion battery is taken as an inspection target object, an inspection target object is not limited thereto.

REFERENCE SIGNS LIST

10 Airtightness inspection Device
11 Lithium Ion Battery
14 Vacuum Chamber
16 Sensor Unit
17 Clean Booth
34 Common Piping System
35 Initial exhaust System
36 Inspection exhaust System
47 Initial Exhaust Pipe
51 Inspection exhaust pipe
61 Gas Sensor
76a Sensor Face
71 Holder
73 Inlet Port
74 First Exhaust Port
75 Second Exhaust Port
N1 Nozzle

The invention claimed is:

1. A sensor unit comprising a sensor section that detects a gaseous detection target substance, and a holder that internally holds the sensor section, wherein
the sensor section includes:
an element that reacts with the detection target substance, and
a case inside which the element is arranged, and which has a first opening provided in one face, and a second opening provided in another face on an opposite side to the one face; and
the holder includes:
an inlet port that introduces a gas into inside of the holder,
a supply port that is arranged at a position that is close to the one face, and that allows a gas that is introduced into inside of the holder to pass through to the one face side,
a hollow section into which a gas that passes through inside of the case flows from the second opening,
a first flow channel having annular or C-shape that is formed in a circumferential direction of the hollow section,
a plurality of second flow channels that are provided at predetermined intervals in the circumferential direction of the hollow section and that connect the hollow section and the first flow channel, and
an exhaust port that is connected to the first flow channel at a different position from the second flow channels and that discharges a gas that is inside the holder.

2. The sensor unit according to claim 1, wherein the supply port is a nozzle shape.

3. The sensor unit according to claim 1, further comprising:
a third flow channel having annular shape that is connected to the inlet port; and
a conical space portion that is connected to the third flow channel at a plurality of places that are at predetermined intervals in a circumferential direction, and that has a top portion that is connected to the supply port.

4. The sensor unit according to claim 1, further comprising:
a relief flow channel that causes at least a part of a gas that passes through the supply port to flow along the one face; and
a discharge flow channel that connects the relief flow channel and the exhaust port.

5. An airtightness inspection device, comprising a sensor unit according to claim 1, a vacuum chamber that houses an inspection target object, and an inspection exhaust section that has an inspection exhaust pipe which is connected to the vacuum chamber and that performs an inspection exhaust from the vacuum chamber through the inspection exhaust pipe,
wherein the sensor unit is interposed in the inspection exhaust pipe, and introduces an exhaust gas that is exhausted from the vacuum chamber into inside of the holder through the inlet port.

6. The airtightness inspection device according to claim 5, further comprising:
an initial exhaust section that has an initial exhaust pipe that is connected to the vacuum chamber, and that performs an initial exhaust from the vacuum chamber through the initial exhaust pipe; and
a control section that, after lowering a pressure inside the vacuum chamber to a previously set inspection pressure by means of the initial exhaust section, causes an inspection exhaust to be performed by the inspection exhaust section.

7. The airtightness inspection device according to claim 6, further comprising:
an inspection exhaust valve that is interposed in the inspection exhaust pipe, and that is provided further on an upstream side than the sensor unit,
an initial exhaust valve that is interposed in the initial exhaust pipe, and
an atmospheric release valve that is connected to the vacuum chamber, wherein
at a time of the initial exhaust, the control section opens the initial exhaust valve and closes the inspection exhaust valve and the atmospheric release valve, and at a time of the inspection exhaust, the control section opens the inspection exhaust valve and closes the initial exhaust valve and the atmospheric release valve.

8. The airtightness inspection device according to claim 7, further comprising:
a gas sensor for initial exhaust that is interposed in the initial exhaust pipe, and that is provided further on a downstream side than the initial exhaust valve,
wherein the control section opens the inspection exhaust valve only at a time of the inspection exhaust, and at a time of the initial exhaust the control section makes a determination regarding an airtightness of an inspection target object using an output voltage from the gas sensor for initial exhaust, and ends an inspection at a time point at which the control section determines that the airtightness is defective.

9. The airtightness inspection device according to claim 5, further comprising:
a first flow control valve and a second flow control valve that are respectively interposed in the inspection exhaust pipe, with the first flow control valve being provided on an upstream side relative to the sensor unit, and the second flow control valve being provided on a downstream side relative to the sensor unit.

* * * * *